UNITED STATES PATENT OFFICE.

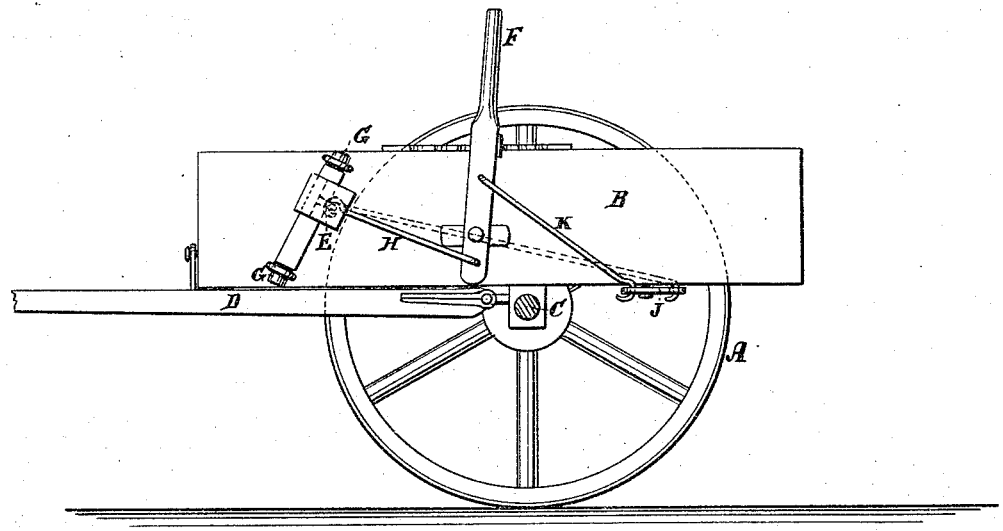
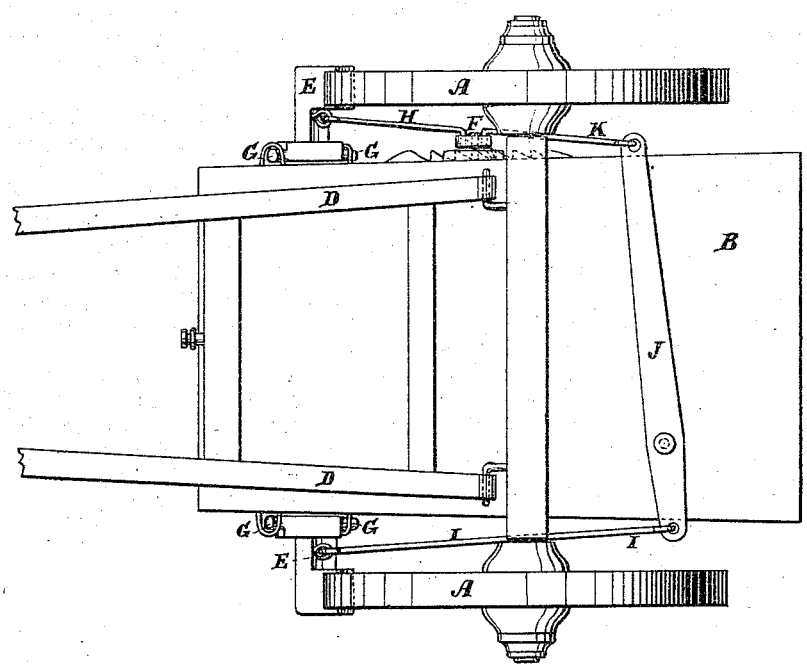

JUSTUS B. MEAD, JR., OF DARIEN, CONNECTICUT.

IMPROVEMENT IN CART-BRAKES.

Specification forming part of Letters Patent No. 157,854, dated December 15, 1874; application filed October 17, 1874.

*To all whom it may concern:*

Be it known that I, JUSTUS B. MEAD, Jr., of Darien, Fairfield county, Connecticut, have invented a new and Improved Cart-Brake, of which the following is a specification:

My invention consists of brakes for the wheels of a horse or ox cart, or other two-wheeled vehicle, together with the apparatus for working them, arranged on the box independently of the shafts, so that they will turn around with the wheels, and the box to dump while pressing on them, and to utilize the brakes for tilting the box when the cart is backing up to the place to dump. My invention also consists of the brakes pivoted to the sides of the box, one to each wheel, and connected in a peculiar manner to one lever, whereby both may be operated by it.

Figure 1 is a side elevation of a cart with my improved brake applied to it, and Fig. 2 is a plan view of the cart inverted.

A represents the wheels; B, the box; C, the axle; D, the shafts; E, the brakes; and F, the brake-lever. The brakes are pivoted to the side of the box at G, so as to swing against the wheels and away from them. The brake, which is on the same side as the lever, is connected directly to it by the rod H. The other is connected by a rod, I, with a lever, J, pivoted to the bottom of the box, behind the axle, and extending to the outer side, where it is connected with the brake-lever F by the rod K.

The brakes may be arranged high up on the wheels, or over on the rear side, if preferred. Probably the best plan is to arrange them at the top, as the pressure upon the horse's back will be less than when arranged on either side.

Having thus described my invention, I claim as new and desire to secure by Letters Patent—

1. The brake-lever, connected and combined solely with the wagon-box to turn therewith, substantially as shown and described.

2. The brakes E, pivoted to the sides of the box of a cart or other two-wheeled vehicle, in combination with the wheels, substantially as specified.

3. The brake of one side of the box connected directly to the lever F, and the one of the other side connected to it by means of a lever, J, extending under the box and pivoted to it, all combined substantially as specified.

JUSTUS B. MEAD, JR.

Witnesses:
 JAMES CURZOA,
 IRA SCOFIELD.